United States Patent
Schwarzkopf

[15] 3,672,265
[45] June 27, 1972

[54] APPARATUS FOR STACKING FLATTENED BAGS OF THERMOPLASTIC MATERIAL WHICH ARE MADE IN A BAG-MAKING MACHINE

[72] Inventor: August Schwarzkopf, Heinestrabe, Germany

[73] Assignee: Windmoller & Holscher, Westphalia, Munsterstrasse, Germany

[22] Filed: March 2, 1971

[21] Appl. No.: 120,161

[52] U.S. Cl. ..................................93/93 DP, 198/35, 214/7, 271/79
[51] Int. Cl. .......................................................B65h 33/00
[58] Field of Search...............93/93.3, 93 R; 198/35; 271/79; 214/7

[56] References Cited

UNITED STATES PATENTS

| | | | |
|---|---|---|---|
| 2,258,880 | 10/1941 | Bobst | 93/58.3 X |
| 3,323,425 | 6/1967 | Bruckmuller | 93/93 DP |

*Primary Examiner*—Bernard Stickney
*Attorney*—Fleit, Gipple & Jacobson

[30] Foreign Application Priority Data

March 4, 1970    Germany...............P 20 10 153.5

[57] ABSTRACT

Stacking apparatus for flattened bags of thermoplastic material welded and severed from an intermittently fed two-ply web in a bag-making machine, which is comprised of a pair of conveyor chains carrying equally spaced bag-gripping bars disposed, when located in the conveying run of said chains, to be moved from a bag-receiving end of the apparatus substantially at the same level and in the same direction as the web is fed in the bag-making machine. The gripping bars are arranged to enter the conveying run successively spaced from a welding tool of the machine equal to the length or width of the bags being made so that, when the web is stationary, its leading end can be engaged by one of the gripping bars. Means are provided for closing successive gripping bars to engage the bags severed from the web. Also, means are provided for intermittently advancing the conveyor chains in sequence with the operating cycle of the bag-making machine by a distance equal to the spacing of the gripping bars along the chains. Then successive gripping bars are opened to release the bags. A stacking conveyor is disposed beneath the conveying run of the chains and receives successive bags in a superposed fashion when released by the successive gripping bars. The superposed bags are carried away by the stacking conveyor when a predetermined number of bags has been superposed to form a stack.

7 Claims, 5 Drawing Figures

INVENTOR
August SCHWARZKOPF

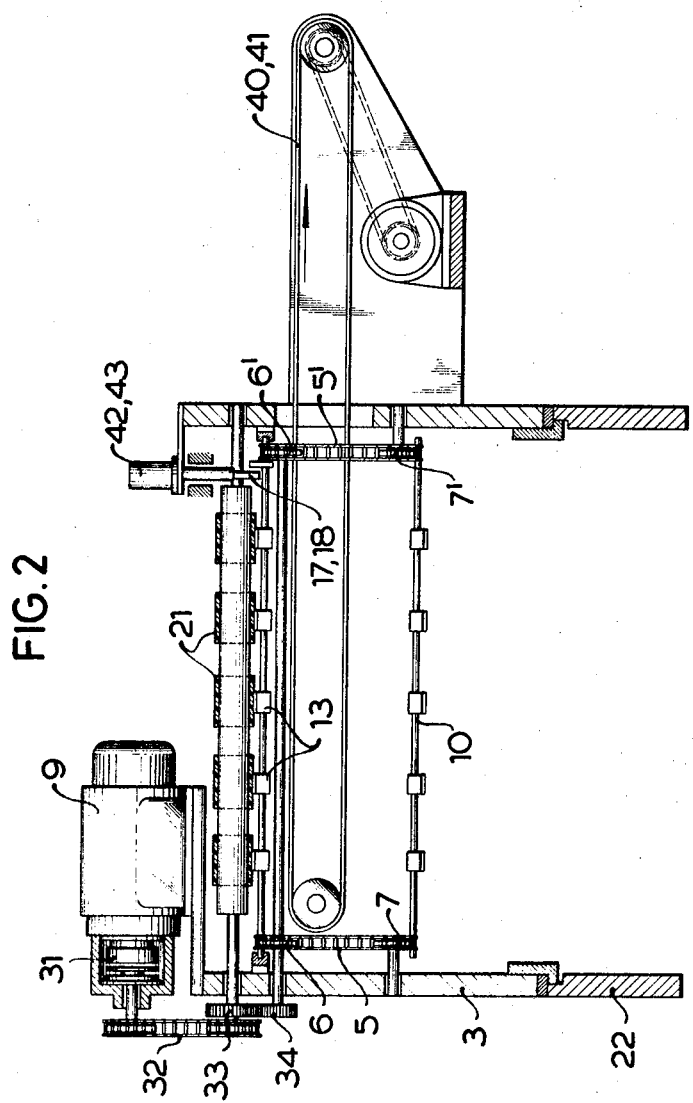

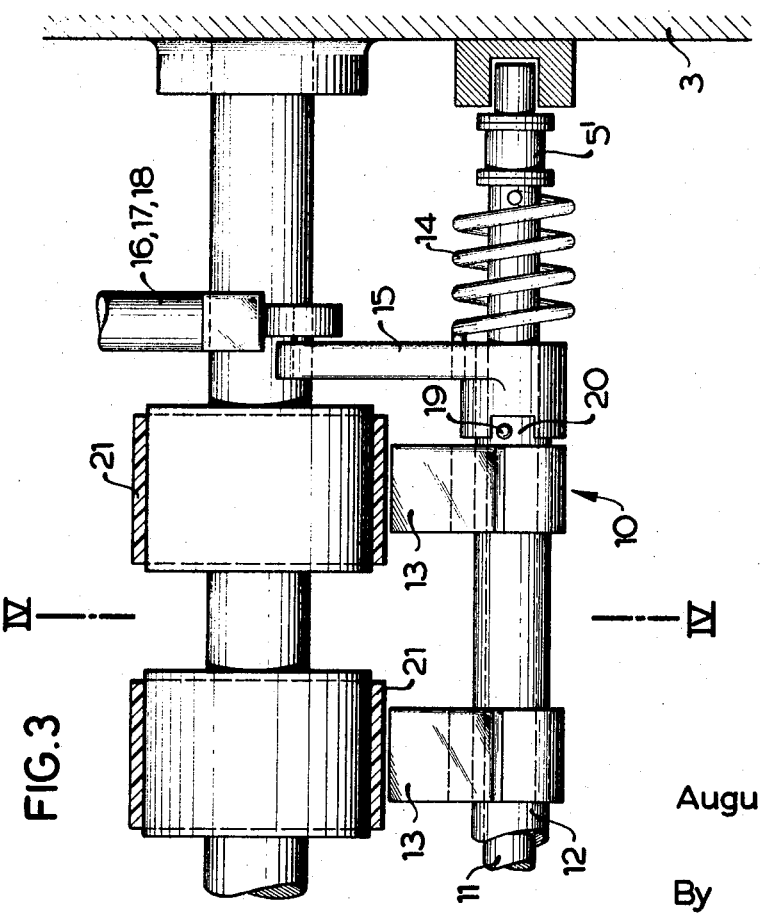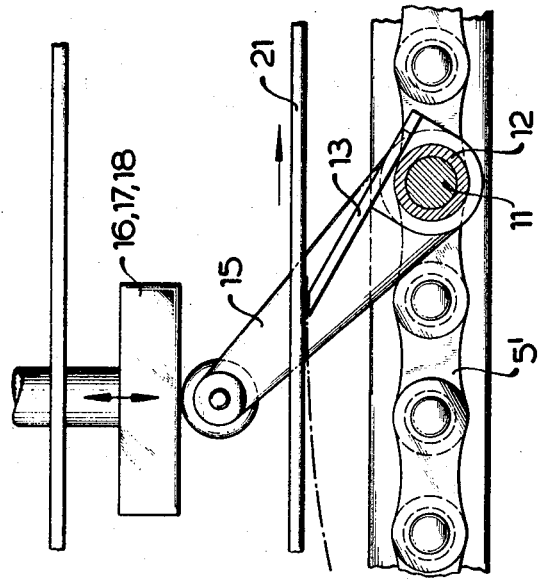

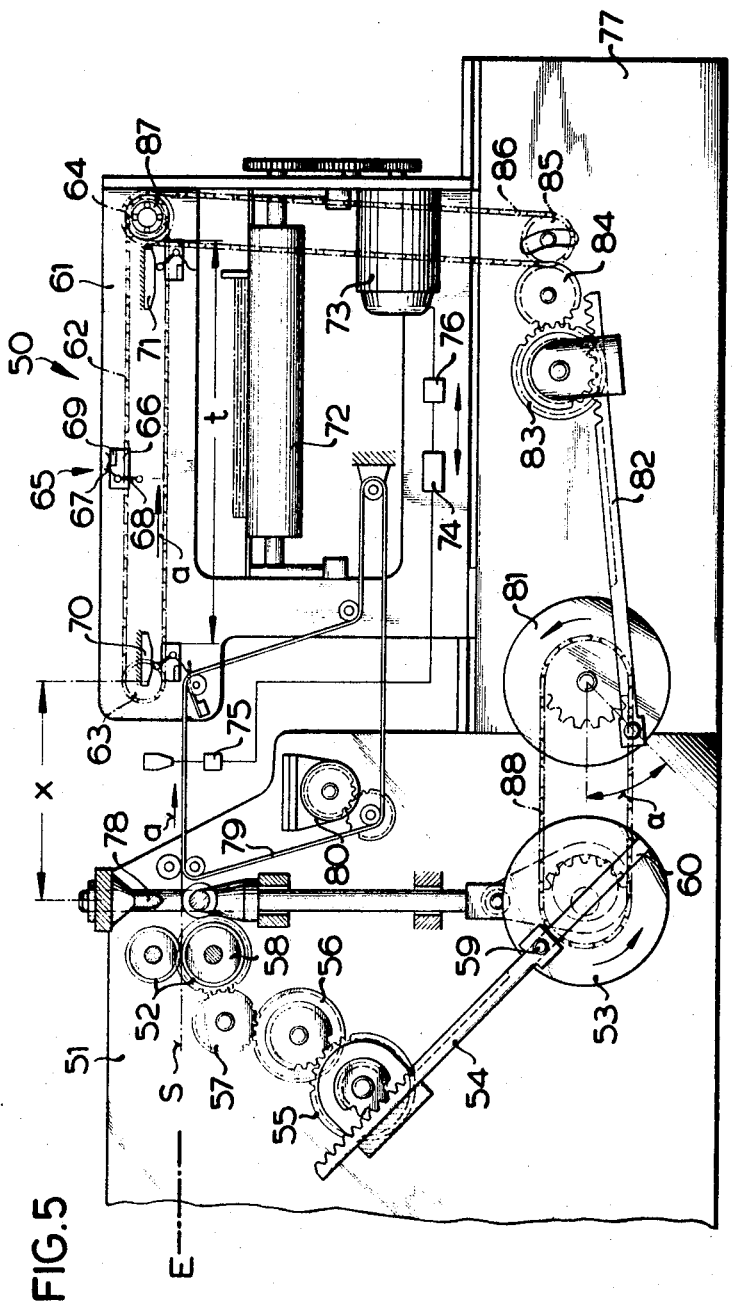

APPARATUS FOR STACKING FLATTENED BAGS OF THERMOPLASTIC MATERIAL WHICH ARE MADE IN A BAG-MAKING MACHINE

The invention relates to an apparatus for stacking flattened bags of thermoplastic material which are made in a bag-making machine by welding and severing an intermittently fed two-ply web, the web being welded and severed at intervals corresponding to the length or width of the bags to be made.

The bags are injected from the bag-making machine at high speed and, if they are flung into a stacking magazine or onto a stacking belt in known manner, interruptions in operation often occur. The cause for these interruptions is generally the intense flexibility and smoothness of the plastics film from which the bags are made and particularly the weld seam at the leading end of each bag. In contrast with bags made from relatively stiff materials such as paper, bags of thin and flexible plastics film do not with any degree of certainty retain the direction in which they are flung from the bag-making machine. They are often uncontrolably displaced or turned out of their path and thus they will not be accurately superposed during stacking. The presence of the weld seam at the leading end of each bag aggrevates this problem because it often causes the leading edge to be wavy so that unpredictable steering effects are exerted on the bag during its free flight to the stacking station. Displacement from the desired path becomes more marked the high the speed with which each bag is flung from the bag-making machine. Also, since the weld seam makes the bag nose-heavy to a certain extent, the bag will readily overturn. Ejecting the bags onto a slowly moving conveyor on which they are deposited in overlapping scale formation does not really solve the problem because pushing the overlapping bags together to make a stack is difficult by reason of the plastics film bag material.

The invention aims to provide a stacking apparatus which overcomes the above-mentioned difficulties and will permit bags to be stacked with their edges aligned even with very high production rates.

According to the invention, there is provided a stacking apparatus for flattened bags of thermoplastic material welded and severed from an intermittently fed two-ply web in a bag-making machine, comprising a pair of conveyor chains carrying equally spaced bag-gripping bars disposed, when located in the conveying run of said chains, so as to be moved from a bag-receiving end of the apparatus substantially at the same level and in the same direction as the web is fed in the bag-making machine, the gripping bars being arranged to enter said conveying run successively at a spacing from a welding tool of the machine equal to the length or width of the bags being made so that, when the web is stationary, its leading end can be engaged by one of the gripping bars, means for closing successive gripping bars to engage the bags severed from the web, means for intermittently advancing the conveyor chains in sequence with the operating cycle of the bag-making machine by a distance equal to the spacing of the gripping bars along the chains, means for opening successive gripping bars to release the bags, and a stacking conveyor disposed beneath the conveying run of the chains, successive bags being superposed on the stacking conveyor when released by successive gripping bars and being carried away by the stacking conveyor when a predetermined number of bags has been superposed to form a stack.

In operation, such an apparatus will engage the bags from the bag-making machine just before they are successively severed from the leading end of the web, take them positively to a stacking station and then, while the conveyor chains are stationary, pile the bags one on top of the other to form a stack. It is important to note that the bags are positively guided to the stacking station and they are deposited rather than flung onto the stack. This will avoid undesirable displacement of the bags and ensure that the bags in each stack are properly aligned.

In the preferred form of the invention, provision is made for a second independently operable stacking conveyor and second independently operable means for opening successive gripping bars to release the bags when disposed above the second stacking conveyor. In this way successive stacks can be formed on alternate stacking conveyors, depending on which opening means are operated, and one stack can be carried away whilst the next stack is being formed. The opening means are preferably reciprocatable by respective lifting motors actuated by a bag counter which comprises sensing means for counting, at the bag-receiving end of the apparatus, the predetermined number of bags to be superposed on each stacking conveyor. Each stack will therefore contain the same number of bags.

The aforementioned intermittent advancing means for the conveyor chains may be actuated by the bag-making machine or by an electric motor of their own and preferably comprise an electromagnetic clutch combined with a slowing-down brake, a first switch actuated in sequence with the operating cycle of the bag-making machine for engaging the clutch at the instant when the welding tool has completed welding of the web in the bag-making machine, and a second switch for disengaging the clutch, the second switch being actuated by cams which are carried by the conveyor chains at intervals equal to the spacing of the gripping bars. This construction for the intermittent advancing means is a simple way of ensuring that the conveyor chains are advanced in sequence with the operating cycle of the bag-making machine by the equivalent of the spacing between the gripping bars. The construction is particularly suitable for use with bag-making machines which are similarly equipped with clutches for controlling intermittent feeding of the web.

In the case of bag-making machines in which the web is intermittently fed by a mechanical rotary stepping device, for example a Maltese cross stepping device or one comprising a crank which reciprocates a rack, the feeding speed is sinusoidal and tugging of the web is avoided by sudden accelerations. For such machines, the intermittent advancing means for the conveyor chains of the stacking apparatus preferably comprise a second similar rotary stepping device which turns in synchronism with the stepping device for the web feed but precedes it by a predetermined angle which is such that the conveyor chains begin to advance while the web is at a standstill at the instant when the welding tool has completed welding of the web and a bag has been severed from the leading end of the web. The stepping device for the conveyor chains will impart the same sinusoidal speed course to the latter as is imparted to the web. The conveyor chains will therefore also be protected from accelerations that might otherwise upset the smooth operation of the stacking apparatus. The sinusoidal course of the speed curve means that the bags transported by the gripping bars will decelerate gradually as they approach the stacking station. If they were to stop suddenly at the stacking station, bags of thin and flexible plastics film could become corrugated under inertia effects and assume an irregular position on the stack.

If the grippers on the gripping bar were to consist of conventional gripping fingers and a backing plate, each bag being engaged between the fingers and the plate, difficulties might arise on introducing the bag to the grippers, especially if the welded leading edge of the bag is corrugated, because such grippers cannot be opened sufficiently. If is therefore preferred that each gripping bar comprises a plurality of gripping fingers which co-operate with a belt conveyor to engage a severed bag, the belt conveyor being disposed above the conveying run of the conveyor chains and being moved in synchronism therewith. In this construction, the gripping fingers will engage the web as soon as the respective gripping bar has entered the conveying run (in this case the upper run) of the conveyor chains and the fingers have become seated against the belt conveyor. Accordingly, during feeding of the web in the bag-making machine the gripping bars need not be located in the feeding plane and they will in no way impede feeding of the web. The pair of conveyor chains preferably extends in a loop within which the or each stacking conveyor is arranged below the upper conveying run of the conveyor chains.

As already mentioned, each gripping bar is arranged to enter the conveying run of the conveyor chains at a spacing from the welding tool of the bag-making machine equal to the length or width of the bags being made so that the leading end of the web can be engaged by the gripping bar before a bag is severed from the web. To permit adjustment of this spacing and alteration of the spacing when different bag lengths or widths are involved, the apparatus preferably comprises a conveyor-supporting frame which is mounted for displacement towards and away from the bag-making machine on a stationary base.

Examples of the invention are diagrammatically illustrated in the accompanying drawings, wherein:

FIG. 2 is a section through the stacking apparatus taken on the line II—II in FIG. 1;

FIG. 3 is an enlarged fragmentary detail of a gripping bar of the FIGS. 1 and 2 stacking apparatus;

FIG. 4 is a section taken on the line IV—IV in FIG. 3 and

FIG. 5 is a side elevation of a second embodiment of stacking apparatus adjacent the discharge end of a differently constructed bag-making machine.

Figure 1:
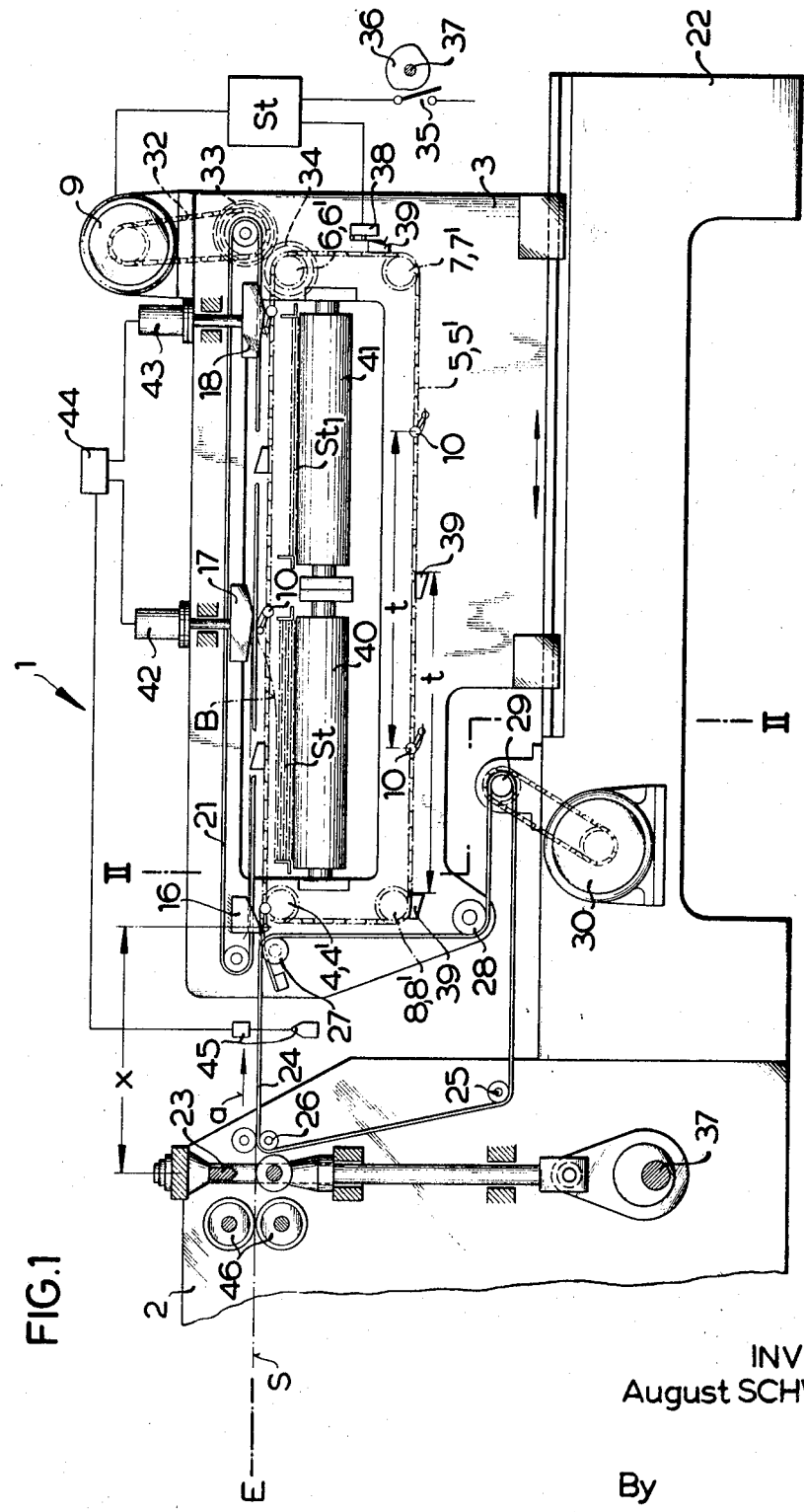
FIG. 1 is a side elevation of a stacking apparatus adjacent the discharge end of a bag-making machine.

Referring to FIG. 1, a stacking apparatus 1 is disposed downstream of the discharge end of a bag-making machine 2. The stacking apparatus comprises a frame 3 in which a pair of endless conveyor chains 5, 5' is guided over pairs of sprockets 4, 4'; 6, 6'; 7, 7' and 8, 8' and intermittently driven by an electric motor 9 so that the upper or conveying run of the chains moves in the same direction $a$ in which a two-ply web S of thermoplastic material is being fed in a plane E through the machine 2. The spacing between the chains 5, 5' as viewed in FIG. 2 is at least equal to the largest width of the web S likely to be processed in the machine 2. Accordingly, the spacing between the chains 5, 5' is equal to the largest bag length or bag width that is likely to be encountered. The chains 5, 5' carry parallel gripping bars 10, the ends of each of which are fixed to the chains so that the gripping bars extend transversely of the conveying direction $a$. The spacing $t$ of the gripping bars along the chains is approximately 20 to 30 percent larger than the biggest bag length or width. As shown in FIGS. 3 and 4, the gripping bars 10 comprise a circular rod 11, the ends of which are held against rotation in the chains 5, 5'. The rod 11 carries a rotatable sleeve 12 to which a plurality of gripping fingers 13 is attached at intervals along its length. The sleeve 12 is rotatable by a lever 15 against the action of a torsion spring 14, the end of the lever 15 carrying a roller which can be engaged by cams 16, 17 and 18 (FIG. 1). Rotation of the sleeve 12 is limited by a pin 19 which is carried by the rod 11 and disposed in a recess 20 of the sleeve. Counter jaws for the gripping fingers 13 are formed by the individual belts of a belt conveyor 21 which extends above the conveying run of the conveyor chains and is moved in synchronism with the chains in the direction of the arrow $a$.

The frame 3 is mounted on a stationary base 22 and can be displaced towards and away from the machine 2. The elevation of the upper conveying run of the conveyor chains is roughly the same as the level of the conveying plane E. The spacing $x$ of the receiving end of the pair of conveyor chains 5, 5' from a welding tool 23 of the bag-making machine is equal to the width or length of the bags being made. The horizontal adjustability of the frame 3 permits the spacing $x$ to be set accurately. A conveyor belt 24 is provided to bridge the gap $x$; it is passed over two rolls 25, 26 on the bag-making machine 2, two rolls 27, 28 on the frame 3 and a drive roll 29 on the base 22 driven by an electric motor 30. This manner of guiding the conveyor belt 24 permits its upper conveying run to be elongated or shortened as the spacing $x$ is altered by displacing the frame 3.

Intermittent driving of the pair of conveyor chains 5, 5' and the associated belt conveyor 21 is effected by an electric motor 9 acting through an electromagnetic clutch 31 (FIG. 2) which is combined with a slowing-down brake, by a chain drive 32 and by gears 33, 34. The electromagnetic clutch is engaged by a switch 35 which is actuated in sequence with the operating cycle of the bag-making machine by a cam 36 (see the right-hand side of FIG. 1). The cam 36 is seated on a shaft 37 of the bag-making machine 2, which shaft reciprocates the welding tool 23 and is in reality located as shown at the left-hand side of FIG. 1; it has been shown again on the right-hand side of FIG. 1 to illustrate its relationship to the cam 36. The rotary position of the cam 36 is so chosen that the chains 5, 5' will commence to move at that instant in which the welding tool 23 starts to move upwardly after having welded the web S. In the illustrated construction, the tool 23 is in the form of a separating welding beam which applies a weld seam to the web and simultaneously severs a bag from its leading end. To stop the chains 5, 5' a switch 38 is provided which is actuated by cams 39 carried by the chains 5, 5' at the same spacing $t$ as the spacing of the gripping bars 10 along the chains. The relative disposition of each cam 39 and the switch 38 is such that, at the instant the conveyor chains 5, 5' come to a halt, one of the gripping bars 10 will be disposed just prior to entering the upper conveying run so that there will be sufficient space between the gripping fingers 13 of this gripping bar and the associated belt conveyor 21 to permit insertion of the leading web end.

Within the loop formed by the pair of conveyor chains 5, 5' there are two intermittently driven stocking conveyors 40, 41 which can be moved transversely of the direction $a$. The stacking conveyors are arranged so that during standstill of the conveyor chains 5, 5' one gripping bar 10 will be located above the right-hand stacking conveyor edge in the vicinity of the cams 17, 18. These cams are alternately movable by means of electric or pneumatic lifting motors 42, 43 into an operative position, i.e. a position in which they will act on the control lever 15 of a gripping bar to open the fingers 13. The lifting motors are controlled by a counter 44 so that one of the cams 17, 18 will remain in its operative position until a predetermined number of bags as set on the counter has been counted by an optical senser 45 and deposited on the stacking conveyor 40 or 41, as the case may be. Alternatively, the lifting motors 42, 43 may be operated in dependence on the operating cycle of the stacking apparatus 1 such that the associated cam 17 or 18 moves downwardly during each standstill period of the conveyor chains 5, 5' and upwardly upon commencement of the next movement of the chains 5, 5', the counter 44 switching the lifting motor in question off again and switching the other lifting motor on after the set number of bags has been reached. In this way the gripping fingers 13 will be opened over the stacking conveyors only after each bag has assumed its correct position above the respective stacking conveyor. Depositing of the bags onto the stacking conveyors takes place while the conveyor chains are stationary and is therefore accurate.

Assuming that the two-ply web S is in the form of a flattened tube which is split along one longitudinal edge, the bags will be made so that their mouths are formed by the split edge and the welding tool 23 will apply weld seams forming the sides of the bags. A pair of feed rolls 46 of the bag-making machine are therefore intermittently driven to advance the web S equivalent to one bag width in the direction of the arrow $a$. During each standstill period of the conveyor chains 5, 5' of the stacking apparatus, the leading edge of the web S will enter between the belt conveyor 21 and the gripping fingers 13 of one of the gripping bars 10. When feeding of the web by the rolls 46 has been terminated the welding tool 23 is moved downwardly onto the web S to apply a transverse weld seam to the latter and simultaneously sever a bag from the leading end of the web along the middle of the weld seam. One-half of the weld seam is therefore disposed on the severed bag to close the side of the latter while the other half remains on the web S to form one side of the next bag. As the welding tool 23 starts to lift from the web S, the cam 36 actuates the switch 35 to advance the conveyor chains 5, 5' and the belt conveyor 21, whereby the severed bag is engaged at its leading edge between the belt conveyor 21 and the gripping fingers 13 of that gripping bar which is about to enter the conveying run of the chains 5, 5'. After the bag has been conveyed through a distance equal to the spacing $t$ between the gripping bars, the chains 5, 5' are stopped by one of the cams 39 acting on the switch 38. At this stage, the bag B will be disposed at a stacking station above the stacking conveyor 40 as illustrated in FIG. 1 and the control lever 15 of the gripping bar 10 holding the bag will be in the vicinity of the cam 17. If the cam 17 is now lowered by means of the lifting motor 42, the gripping fingers 13 are opened to release the bag and deposit it on the stack $St$ being formed on the conveyor 40. If desired, the cam 17 can remain in its lowered position during the entire period required for forming one stack. In this case the gripping fingers 13 will open shortly before the chains 5, 5' come to a stop. After a predetermined number of bags as set on the counter 44 has been deposited on the stacking conveyor 40, the counter 44 will de-energize the lifting motor 42 and at the same time start the lifting motor 43 so that the cam 17 is raised and the cam 18 becomes operative in the same way as just described for the cam 17. The bags will now be deposited on the conveyor 41 to form a stack $Stl$. This gives the conveyor 40 time to withdraw the completed stack $St$ laterally. After the stack $Stl$ has been completed on the stacking conveyor 41, the counter 44 will activate the lifting motor 42 again.

The stacking apparatus illustrated in FIG. 5 differs from the FIG. 1 example insofar as it has a different arrangement for the pair of conveyor chains, differently constructed gripping bars and a different power drive.

The stacking apparatus is generally indicated at 50 and is associated with the bag-making machine 51 having a pair of feed rolls 52 which progressively moves a web in the direction of the arrow $a$ when actuated by a mechanical rotary stepping device. This stepping device is known and comprises a crank plate 53, a thrust rod 54 in the form of a rack, gears 55, 56 and 57 and a free-wheeling device 58. The stepping device drives the feed rolls 52 through the free-wheeling device 58 only during one-half of each revolution of the crank plate 53. During the other half turn, when the thrust rod 54 is executing its return stroke, the free-wheeling device 58 fails to turn the feed rolls 52 to ensure that the web will not be moved backwards. The speed imparted to the web by the crank drive follows a sinusoidal course. The distance through which the web is fed corresponds to the desired length or width of the bag and is adjustable by radially adjusting a crank pin 59 in a groove 60 of the crank plate.

The stacking apparatus 50 comprises a frame 61 which supports a pair of endless conveyor chains 62. The chains pass over sprockets 63 and 64 and carry gripping bars 65 which are spaced at a distance $t$ from one another, extend parallel to one another transversely of the conveying direction $a$ and have their ends fixed to the chains 62. The gripping bars are of known construction. They comprises a support 66 for pivotable gripping fingers 67 which are uniformly distributed along the length of the gripping bars. The fingers on each bar can be moved towards and away from a counter-plate 69 by a common lateral control lever 68. The chains 62 are arranged so that, in their lower run, which is the conveying run, the gripping bars 65 move substantially in the same plane E in which the web is moved through the bag-making machine 51. The control levers 68 of successive gripping bars 65 are actuated by cams 70, 71 for respectively closing and opening the fingers 67. The cams may be fixed or reciprocable in the sequence of the operating cycle of the bag-making machine. Also carried by the frame 61 beneath the chains 62 there is a stacking conveyor 72 which is intermittently driven by an electric motor 73 to convey completed stacks of bags transversely out of the apparatus. The electric motor is controlled by a counter 74 which receives counting pulses from an optical senser 75 which counts the bags received by the stacking apparatus. The counter 74 is of known construction; when it has received the predetermined number of pulses for which it is set and which corresponds to the number of bags to be contained in each stack, it operates a time relay 76 to start the electric motor 73 and to stop it again as soon as the stack has been removed by the conveyor 72.

The frame 61 is mounted on a base 77 so that it can be displaced and then fixed at a desired spacing from the bag-making machine 51. The distance $x$ between a welding tool 78 of the bag-making machine and a gripping bar 65 which, when the chains 62 are stationary, is located at the commencement of the lower conveying run of the chains 62, is equal to the width or length of the bags being made. The gap $x$ is bridged by a belt conveyor 79 which is driven by an electric motor 80 and, in the same manner as the belt conveyor 24 of FIG. 1, is passed over rolls in such a way that the distance $x$ can be varied.

An intermittent drive for the pair of conveyor chains 62 is similar to, and moves in synchronism with, the stepping device 53–58 for feeding the web. It comprises a cam plate 81, a thrust rod 82 in the form of a rack, gears 83, 84 and 85, a chain drive 86 and a free-wheeling device 87. The cam plate 81 is coupled to the cam plate 53 by a chain transmission 88. The crank radius of the plate 81 and the transmission effected by the gears 83, 84, 85 are such that the pair of chains 62 will be advanced in the direction of the arrow $a$ in steps equal to the spacing $t$ between the gripping bars 65, namely approximately 1.2 to 1.3 times the maximum width or length of the bags being made. The chains 62 are coupled to the stepping device 81–87 so that during each standstill period one of the gripping bars 65 will be located at the start of the conveying run in the region of the cam 70 and another gripping bar will be disposed above the right-hand side of the stacking conveyor 72 in the region of the cam 71.

Since the distance $x$ is set to be equal to the width or length of the bags being made as adjusted by the stepping device 53–60 the leading end of the web will, after each feeding step, reach the gripping fingers 67 which are being held open by the cam 70 at the start of the conveying runs of the chains 62. At this time the gripping bar 65 on which the open gripping fingers 67 are mounted will be stationary at the start of the conveying run because the chains 62 precede the feed rolls 52 in their movement by a period equivalent to the angle $\alpha$ indicated on the cam plate 81. While the web is at a standstill, the welding tool 78 which is in the form of a severing welding beam applies a transverse weld seam to the web and simultaneously cuts a bag from its leading end. As soon as the welding tool 78 starts to rise, the chains 62 begin their movement, the gripping fingers 67 closing to engage the leading edge of the severed bag as soon as the associated control lever 68 has run off the cam 70. The gripping bar leads the bag to above the stationary stacking conveyor 72 and deposits the bag thereon as soon as the cam 71 has caused the gripping fingers to open again. After a predetermined number of bags as set on the counter 74 has been severed from the web and deposited on the conveyor 72, the latter is moved laterally to take the completed stacks away.

If the standstill period of the conveyor chains 62 is too short to enable a completed stack to be withdrawn, the chains 62 can be lengthened so that a second stacking conveyor may be accommodated in the manner as already described with reference to FIG. 1.

It will be evident that the conveyor chains in FIG. 5 may instead be equipped with gripping bars of the kind shown in FIGS. 3 and 4, or that the FIG. 5 conveyor chains may be arranged as described with reference to FIGS. 1 and 2, in which case the stepping device 81–87 will be provided instead of the electric drive 9, 31, 32. Similarly, the stacking apparatus of FIG. 1 may have conveyor chains and grippers of the FIG. 5 construction.

I claim:

1. Stacking apparatus for flattened bags of thermoplastic material welded and severed from an intermittently fed two-ply web in a bag-making machine, comprising a pair of conveyor chains carrying equally spaced bag-gripping bars disposed, when located in the conveying run of said chains, so as to be moved from a bag-receiving end of the apparatus substantially at the same level and in the same direction as the web is fed in the bag-making machine, the gripping bars being arranged to enter said conveying run successively at a spacing from a welding tool of the machine equal to the length or width of the bags being made so that, when the web is stationary, its leading end can be engaged by one of the gripping bars, means for closing successive gripping bars to engage the bags severed from the web, means for intermittently advancing the conveyor chains in sequence with the operating cycle of the bag-making machine by a distance equal to the spacing of the gripping bars along the chains, means for opening successive gripping bars to release the bags, and a stacking conveyor disposed beneath the conveying run of the chains, successive bags being superposed on the the stacking conveyor when released by successive gripping bars and being carried away by the stacking conveyor when a predetermined number of bags has been superposed to form a stack.

2. Apparatus according to claim 1 including a second, independently operable stacking conveyor and second, independently operable means for opening successive gripping bars to release the bags when disposed above the second stacking conveyor, whereby successive stacks can be formed on alternate stacking conveyors depending on which opening means are operated.

3. Apparatus according to claim 2, wherein the opening means are reciprocatable by respective lifting motors actuated by a bag counter which comprises sensing means for counting, at the bag-receiving end of the apparatus, the predetermined number of bags to be superposed on each stacking conveyor.

4. Apparatus according to claim 1, wherein the said intermittent advancing means for the conveyor chains comprise an electromagnetic clutch combined with a slowing-down brake, a first switch actuated in sequence with the operating cycle of the bag-making machine for engaging the clutch at the instant when the welding tool has completed welding of the web in the bag-making machine, and a second switch for disengaging the clutch, the second switch being actuated by cams which are carried by the conveyor chains at intervals equal to the spacing of the gripping bars.

5. Apparatus according to claim 1 in combination with a bag-making machine in which the web is intermittently fed by a mechanical rotary stepping device, wherein the said intermittent advancing means for the conveyor chains comprise a second similar rotary stepping device which turns in synchronism with the stepping device for the web feed but precedes it by a predetermined angle which is such that the conveyor chains begin to advance while the web is at a standstill at the instant when the welding tool has completed welding of the web and a bag has been severed from the leading end of the web.

6. Apparatus according to claim 1, wherein each gripping bar comprises a plurality of gripping fingers which co-operate with a belt conveyor to engage a severed bag, the belt conveyor being disposed above the conveying run of the conveyor chains and being moved in synchronism therewith, and wherein the pair of conveyor chains extends in a loop within which the or each stacking conveyor is arranged.

7. Apparatus according to claim 1, including a conveyor supporting frame which is displaceably mounted on a stationary base for adjusting the spacing of the bag-receiving end of the apparatus from the bag-making machine.

* * * * *